US006194490B1

(12) United States Patent
Roth et al.

(10) Patent No.: US 6,194,490 B1
(45) Date of Patent: Feb. 27, 2001

(54) CURABLE COMPOSITION COMPRISING EPOXIDIZED NATURAL OILS

(75) Inventors: Martin Roth, Hölstein; Qian Tang, Oberwil; Roger Malherbe, Muttenz, all of (CH); Catherine Schoenenberger, Saint-Louis (FR)

(73) Assignee: Vantico, Inc., Brewster, NY (US)

( * ) Notice: Subject to any disclaimer, the term of this patent is extended or adjusted under 35 U.S.C. 154(b) by 0 days.

(21) Appl. No.: 09/253,162

(22) Filed: Feb. 19, 1999

(30) Foreign Application Priority Data

Feb. 27, 1998 (CH) .................................................. 484/98

(51) Int. Cl.⁷ .............................. C08K 3/36; C08L 63/02
(52) U.S. Cl. ............................ 523/443; 528/94; 528/112
(58) Field of Search .............................. 523/443; 528/94, 528/112

(56) References Cited

U.S. PATENT DOCUMENTS

| 3,792,011 | 2/1974 | Smith et al. | 260/37 |
|---|---|---|---|
| 4,040,994 | 8/1977 | Lewis et al. | 260/18 |
| 4,066,625 | * 1/1978 | Bolger | 260/59 R |
| 4,925,886 | 5/1990 | Atkins et al. | 523/443 |

FOREIGN PATENT DOCUMENTS

| 1 234 991 | 2/1967 | (DE) . |
| 926888 | 5/1963 | (GB) . |
| 952322 | 3/1964 | (GB) . |
| 62-161819 | * 7/1987 | (JP) . |

OTHER PUBLICATIONS

Derwent Abstract 1987–238806 [34]for JP 62161819.
Derwent Abstract 1996–236162 [24]for JP8092356.
Derw. Abst. No. 78552P [00]1968 of DE 1 234 991.
Chemical Abstract No. 120:78332 (1994).
Rösch et al., Polymer Bulletin vol. 31, No. 6, pp. 679–685 (1993).
Lee and Neville, Handbook of Epoxy Resins, pp. 14–7, 14–9, 1967.*
Chem. Eng., p. 207, 1962.*

* cited by examiner

Primary Examiner—Robert Dawson
Assistant Examiner—D. Aylward
(74) Attorney, Agent, or Firm—Michele A. Kovaleski

(57) ABSTRACT

A composition, which comprises
(a) a compound containing at least one epoxy group in inner position per molecule, obtained by epoxidation of a natural unsaturated oil or of its derivative;
(b) an epoxy compound selected from the group consisting of glycidyl ethers, glycidyl esters and cycloaliphatic epoxides;
(c) a polycarboxylic acid anhydride;
(d) a compound of formula I, I, III or IV or an acid adduct of a compound of formula I, II, III or IV (I)

(II)

(III)

(IV)

wherein $R_1$ to $R_4$ are each independently of one another hydrogen; $C_1$–$C_{18}$alkyl which is unsubstituted or substituted by one or more than one hydroxyl group amino group, halogen atom, cyano group, $C_1$–$C_6$alkoxy group or $C_1$–$C_6$cyanalkoxy group; $C_5$–$C_{14}$aryl, $C_6$–$C_{24}$aralkyl, $C_3$–$C_{14}$heteroaryl or $C_4$–$C_{14}$heteroaralkyl which are unsubstituted or substituted by one or more than one $C_1$–$C_6$alkyl group, $C_1$–$C_6$alkoxy group or halogen atom, n is an integer from 1 to 3, and
$R_5$ and $R_6$ are each independently of the other $C_1$–$C_6$alkyl or, together with the nitrogen atom, form a five- or six-membered ring, and
(e) 20–90% by weight, based on the entire composition, of a filler, the average diameter of the filler particles being from 0.1 µm to 5.0 mm, can be cured to products having a high $T_g$ and are suitable in particular as encapsulating material for electrical and electronic components.

16 Claims, No Drawings

CURABLE COMPOSITION COMPRISING EPOXIDIZED NATURAL OILS

The present invention relates to a curable composition comprising at least two different epoxy resins, a hardener, curing accelerator and filler, to the crosslinked products obtainable therefrom and to the use of these compositions as encapsulating material for electrical or electronic components.

In recent years, investigations were increasingly carried out with the objective to replace the conventional epoxy resins based on glycidyl ethers, glycidyl esters and cycloaliphatic epoxides at least in part by the inexpensive and ecologically and toxicologically safe epoxidised natural oils. However, the low curing rate and concomitant long gel time of such systems are insufficient for certain applications. The mechanical properties and, in particular, the low glass transition temperatures of the cured products are to date also unsatisfactory.

DE-A-2247617 describes epoxy resin compositions comprising mixtures of epoxidised natural oils and glycidyl ether resins which are cured with acid anhydrides and quaternary phosphonium salts as catalysts. These resin mixtures have high storage stability at room temperature and can be used as coating varnish for low voltage and high voltage insulators.

U.S. Pat. No. 4,040,994 discloses epoxy resin systems comprising a bisphenol A resin, a mixture consisting of least two epoxidised fatty acid esters, an anhydride hardener and a curing accelerator, for example a tertiary amine, which are distinguished by high thermal shock resistance and which can be used as adhesives, coatings, laminating resins and as electrical insulating materials.

However, the curing of these compositions proceeds only incompletely at the temperatures and curing times conventionally used for curing anhydrides, which is reflected in the relatively low glass transition temperatures of the cured products.

It is the object of this invention to provide curable compositions based on epoxidised natural oils which afford equally good or only slightly less good results with respect to mechanical properties and glass transition temperature as the conventionally used epoxy resins based on bisphenol diglycidyl ethers.

It has now been found that it is possible to fully cure within a short time epoxy resin mixtures comprising an epoxidised natural oil and a glycidyl compound or a cycloaliphatic epoxide using a combination of an anhydride hardener and a specific imidazole, amidine or aminopyridine accelerator to products having good fracture-mechanical properties and a high glass temperature.

This invention relates to a composition, which comprises
(a) a compound containing at least one epoxy group in inner position per molecule, obtained by epoxidation of a natural unsaturated oil or of its derivative;
(b) an epoxy compound selected from the group consisting of glycidyl ethers, glycidyl esters and cycloaliphatic epoxides;
(c) a polycarboxylic acid anhydride;
(d) a compound of formula I, II, III or IV or an acid adduct of a compound of formula I, I, II or IV

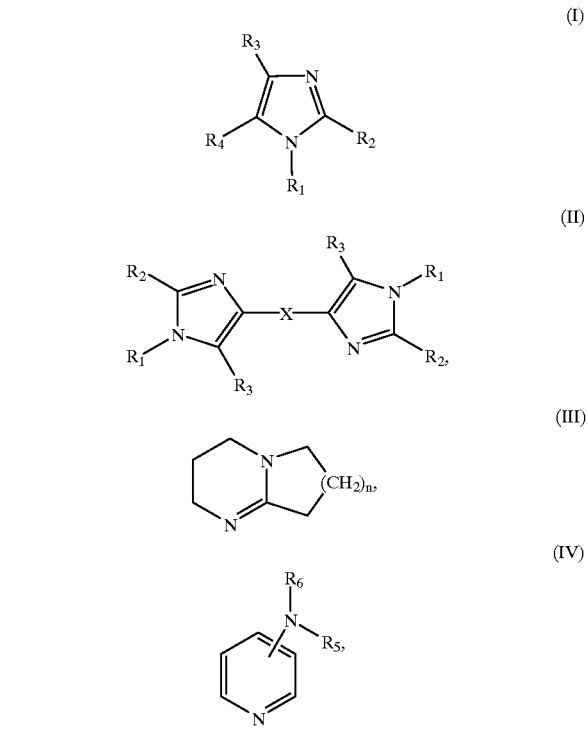

wherein $R_1$ to $R_4$ are each independently of one another hydrogen; $C_1$–$C_{18}$alkyl which is unsubstituted or substituted by one or more than one hydroxyl group, amino group, halogen atom, cyano group, $C_1$–$C_6$alkoxy group or $C_1$–$C_6$cyanoalkoxy group; $C_5$–$C_{14}$aryl, $C_6$–$C_{24}$aralkyl, $C_3$–$C_{14}$heteroaryl or $C_4$–$C_{14}$heteroaralkyl which are unsubstituted or substituted by one or more than one $C_1$–$C_6$alkyl group, $C_1$–$C_6$alkoxy group or halogen atom, n is an integer from 1 to 3, and
$R_5$ and $R_6$ are each independently of the other $C_1$–$C_6$alkyl or, together with the nitrogen atom, are a five- or six-membered ring, and (e) 20–90% by weight, based on the entire composition, of a filler, the average diameter of the filler particles being from 0.1 μm to 5.0 mm.

Component (a) in the novel compositions may be epoxidation products of unsaturated fatty acid esters. It is preferred to use epoxy-containing compounds which are derived from mono- and polyfatty acids containing 12 to 22 carbon atoms and having a iodine value from 30 to 400, for example lauroleic acid, myristoleic acid, palmitoleic acid, oleic acid, gadoleic acid, erucic acid, ricinolic acid, linolic acid, linolenic acid, elaidic acid, likanic acid, arachidonic acid and clupanodonic acid.

Preferred components (a) are epoxidation products of triglycerides of formula IX

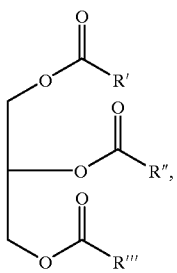

(IX)

wherein R', R" and R'" are each independently of one another saturated or unsaturated fatty acid radicals containing 12 to 25 carbon atoms, at least one of R', R" and R'" being an unsaturated fatty acid radical.

Suitable epoxidation products are, for example, those of soybean oil, linseed oil, perilla oil, tung oil, oiticia oil, safflower oil, poppy oil, hemp oil, cottonseed oil, sunflower oil, rapeseed oil, high-oleic triglycerides, triglycerides of euphorbia plants, peanut oil, olive oil, olive kernel oil, almond oil, kapok oil, hazelnut oil, apricot kernel oil, beechnut oil, lupine oil, maize oil, sesame oil, grapeseed oil, lallemantia oil, castor oil, herring oil, sardine oil, menhaden oil, whale oil, tall oil and derivatives therefrom.

Also suitable are higher unsaturated derivatives which can be obtained by subsequent dehydration reactions of these oil.

The olefinic double bonds of the unsaturated fatty acid radicals of the above compounds can be epoxidised by known methods, for example by reaction with hydrogen peroxide, where required in the presence of a catalyst, an alkylhydroperoxide or a peracid, such as performic acid or peracetic acid.

Within the scope of this invention, component (a) may be both the completely epoxidised oils as well as the partially epoxidised derivatives yet having free double bonds.

Particularly preferred components (a) are epoxidised soybean oil and epoxidised linseed oil.

The properties of the cured products prepared from the novel compositions can be varied within a wide range. In particular the use of a mixture consisting of at least two different epoxy resins having different epoxy values as component (a) allows the specific adjustment of desired properties of the cured materials, for example an optimum balance between electrical and mechanical properties.

Another embodiment of this invention therefore relates to a composition, wherein component (a) is a mixture of two or more compounds having different epoxy values, in particular a mixture of epoxidised soybean oil and epoxidised linseed oil.

Suitable components (b) of the novel compositions are all types of epoxides containing a glycidyl or β-methylglycidyl group or a cycloalkylene oxide radical.

Examples of suitable epoxy resins are polyglycidyl ethers and poly(β-methylglycidyl)ethers, which are obtainable by reacting a compound, containing at least two free alcoholic and/or phenolic hydroxyl groups per molecule, with epichlorohydrin or β-methylepichlorohydrin under alkaline conditions or in the presence of an acid catalyst with subsequent treatment with alkali.

Suitable starting compounds for the preparation of such glycidyl or β-methylglycidyl ethers are, for example, acyclic alcohols, such as ethylene glycol, diethylene glycol and higher poly-(oxyethylene)glycols, propane-1,2-diol and poly(oxypropylene)glycols, propane-1,3-diol, butane-1,4-diol, poly(oxytetramethylene)glycols, pentane-1,5-diol, hexane-1,6-diol, hexane-2,4,6-triol, glycerol, 1,1,1-trimethylolpropane, pentaerythritol or sorbitol, cycloaliphatic alcohols, such as resorcitol, quinitol, bis(4-hydroxycyclohexyl)methane, 2,2-bis(4-hydroxycyclohexyl) propane and 1,1-bis(hydroxymethyl)-cyclohexene-3, and alcohols containing aromatic nuclei, such as N,N-bis(2-hydroxyethyl)aniline and p,p'-bis-(2-hydroxyethylamino) diphenylmethane.

Other dihydroxy compounds suitable for the preparation of glycidyl or β-methylglycidyl ethers are mononuclear phenols, such as resorcinol and hydroquinone, polynuclear phenols, such as bis(4-hydroxyphenyl)methane, 4,4-dihydroxydiphenyl, bis(4-hydroxyphenyl)sulfone, 1,1,2,2-tetrakis(4-hydroxyphenyl)ethane, 2,2-bis(4-hydroxyphenyl) propane (bisphenol A) and 2,2-bis(3,5-dibromo-4-hydroxyphenyl)propane and also novolaks, for example phenol novolaks and cresol novolaks.

Polyglycidyl esters and poly(β-methylglycidyl)esters can be obtained by reacting a compound containing two or more carboxylic acid groups per molecule with epichlorohydrin, glycerol-dichlorohydrin or β-methylepichlorohydrin in the presence of alkali. Such polyglycidyl esters can be derived from aliphatic polycarboxylic acids, for example oxalic acid, succinic acid, glutaric acid, adipic acid, pimelic acid, subaric acid, azelaic acid, sebacic acid or dimerised or trimerised linoleic acid, from cycloaliphatic polycarboxylic acids, such as tetrahydrophthalic acid, 4-methyltetrahydrophthalic acid, hexahydrophthalic acid and 4-methylhexahydrophthalic acid, and from aromatic polycarboxylic acids, such as phthalic acid, isophthalic acid and terephthalic acid.

Other epoxides suitable as component (b) are poly-(N-glycidyl) compounds, for example the products which are obtainable by dehydrochlorination of the reaction products of epichlorohydrin with amines containing at least two active hydrogen bound to amino nitrogen atoms, such as aniline, n-butylamine, bis(4-aminophenyl)methane and bis (4-methylaminophenyl)-methane. These include also triglycidyl isocyanurate and N,N'-diglycidyl derivatives of cyclic alkylene ureas, such as ethylene urea and 1,3-propylene urea, and hydantoins, such as 5,5-dimethylhydantoin.

Also suitable are poly-(S-glycidyl) compounds, such as the di-S-glycidyl derivatives of dithiols, for example ethane-1,2-dithiol and bis(4-mercaptomethylphenyl) ether.

Within the scope of this invention, cycloaliphatic epoxides are understood to mean epoxy resins based on cycloalkylene oxides.

Examples of such epoxy resins having cycloalkylene oxide structures are bis(2,3-epoxycyclopentyl)ether, 2,3-epoxycyclopentyl glycidyl ether, 1,2-bis(2,3-epoxycyclopentyl)ethane, vinylcyclohexene dioxide, 3,4-epoxycyclohexylmethyl-3',4'-epoxycyclohexanecarboxylate, 3,4-epoxy-6-methylcyclohexylmethyl-3',4'-epoxy-6'-methylcyclohexanecarboxylate, bis(3,4-epoxycyclohexylmethyl)adipate and bis(3,4-epoxy-6-methylcyclohexylmethyl)adipate.

Suitable components (b) are also those epoxy resins, in which the 1,2-epoxy groups are bound to different heteroatoms, for example the N,N,O-triglycidyl derivative of 4-amino-phenol, the glycidyl ether/glycidyl ester of salicylic acid or p-hydroxybenzoic acid, N-glycidyl-N'-(2-glycidyloxypropyl)-5,5-dimethylhydantoin and 2-glycidyloxy-1,3-bis-(5,5-dimethyl-1-glycidylhydantoinyl-3)propane.

It is of course also possible to use mixtures of different epoxy resins as component (b).

Preferred components (b) are diglycidyl ethers of bisphenols, epoxy novolaks, diglycidyl esters of dicarboxylic acids or compounds containing two terminal cycloalkene oxide groups.

Particularly preferred novel compositions are those, wherein component (b) is a diglycidyl ether of formula V, a diglycidyl ester of formula VIa or VIb or a cycloaliphatic epoxide of formula VII

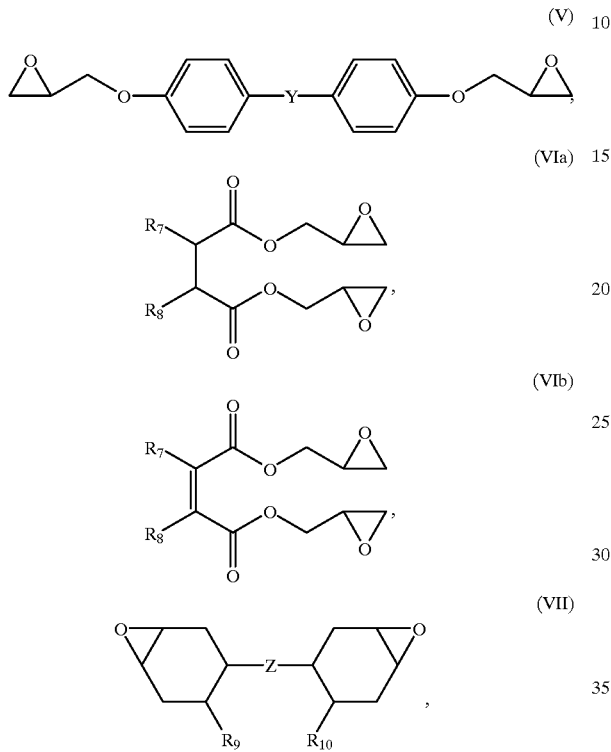

wherein Y is a direct bond, methylene, ethylene, propylene, isopropylidene, —O—, —CO—, —S— or —SO$_2$—, R$_7$ and R$_8$ are each independently of the other hydrogen or C$_1$–C$_6$alkyl or, together with the carbon atoms to which they are bound, are a five- or six-membered ring, R$_9$ and R$_{10}$ are each independently of the other hydrogen or C$_1$–C$_6$alkyl, and Z is isopropylidene, —OCH$_2$CH$_2$O—, —COOCH$_2$— or —CH$_2$O—CO—(CH$_2$)$_4$—CO—OCH$_2$—.

Particularly preferred components (b) are diglycidyl ether of bisphenol A, hexahydrophthalic acid diglycidyl ester and 3,4-epoxycyclohexanecarboxylic acid-3',4'-epoxycyclohexylmethyl ester.

Component (c) in the compositions of this invention may by any of the anhydride hardeners known to the skilled person.

These anhydride hardeners may be linear aliphatic polymeric anhydrides, such as polysebacic acid polyanhydride or polyazelaic acid polyanhydride, or cyclic carboxylic acid anhydrides.

Cyclic carboxylic acid anhydrides are particularly preferred.

Examples of cyclic carboxylic acid anhydrides are: succinic anhydride, citraconic anhydride, itaconic anhydride, alkenyl-substituted succinic anhydride, dodecenylsuccinic anhydride, maleic anhydride and tricarballylic anhydride, maleic anhydride adduct with cyclopentadiene or methylcyclopentadiene, linolic adduct with maleic anhydride, alkylated endoalkylenetetrahydrophthalic acid anhydrides, tetrahydrophthalic anhydride, methyltetrahydrophthalic anhydride, hexahydrophthalic anhydride and methylhexahydrophthalic anhydride.

Other examples of cyclic carboxylic acid anhydrides are aromatic anhydrides, such as pyromellitic dianhydride, trimellitic anhydride and phthalic anhydride.

It is also possible to use -chlorinated or brominated compounds, for example tetrachlorophthalic anhydride, tetrabromophthalic anhydride, dichloromaleic anhydride and chloroendic anhydride.

Preferred components (d) are dicarboxylic acid anhydride of formulae VIIIa and VIIIb

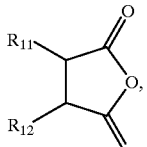

(VIIa)

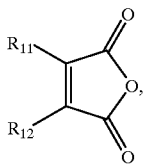

(VIIb)

wherein R$_{11}$ and R$_{12}$ are each independently of the other hydrogen or C$_1$–C$_6$alkyl or, together with the carbon atoms to which they are bound, are a five- or six-membered ring.

Another suitable anhydride hardener for the novel composition is the Diels-Alder reaction product of 1 mol of tung oil and 0.5 to 3 mol of maleic anhydride of the idealised formula X:

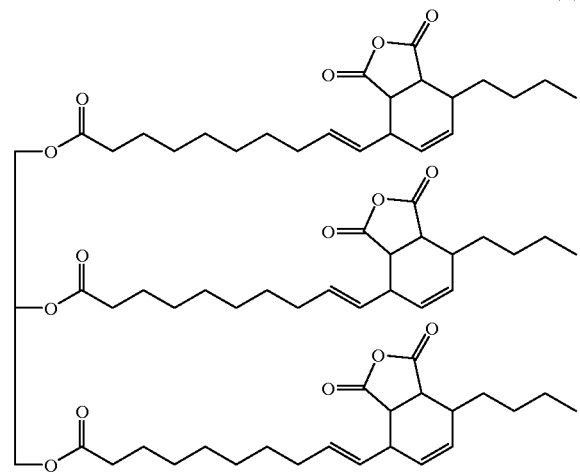

Particularly preferred components (d) are methyltetrahydrophthalic anhydride, hexahydrophthalic anhydride and methylhexahydrophthalic anhydride.

The compounds of formulae I, II, III and IV suitable as component (d) are known and some of them are commercially available.

Any R$_1$ to R$_6$ defined as alkyl in formulae I-IV may be straight-chain or branched alkyl groups. Examples are methyl, ethyl, isopropyl, n-propyl, n-butyl, isobutyl, sec-butyl, tert-butyl and the different isomeric pentyl, hexyl, heptyl, octyl, nonyl, decyl, unhdecyl, dodecyl, tridecyl, tetradecyl, pentadecyl, hexadecyl, heptadecyl and octadecyl groups.

$R_1$ to $R_4$ defined as aryl preferably contain 6 to 1 0 carbon atoms and may be, for example, phenyl, tolyl, pentalinyl, indenyl, naphtyl, azulinyl and anthryl.

$R_1$ to $R_6$ defined as aralkyl preferably contain 7 to 12 carbon atoms and, particularly preferably, 7 to 10 carbon atoms and may be, for example, benzyl, phenethyl, 3-phenylpropyl, α-methylbenzyl, 4-phenylbutyl or α,α-dimethylbenzyl.

Heteroaryl preferably contains 4 or 5 carbon atoms and one or two heteroatoms, preferably oxygen, sulfur or nitrogen atoms. Heteroaryl may be, for example, a radical of pyrrole, furan, thiophene, oxazole, thiazole, pyridine, pyrazine, pyrimidine, pyridazine, indole, purine or quinoline.

Heteroaralkyl is an alkyl group which is substituted by one of the above heteroaryl groups.

Examples of imidazoles of formula I are imidazole, 1-methylimidazole, 2-methylimidazole, 2-ethylimidazole, 2-isopropylimidazole, 2-undecylimidazole, 2-heptadecylimidazole, 2-ethyl-4-methylimidazole, 2-phenyl-4-methylimidazole, 1-phenylimidazole, 2-phenyimidazole, 1-benzyl-2-methylimidazole, 1-cyanoethyl-2-methylimidazole, 1-cyanoethyl-2-phenylimidazole, 1-cyanoethyl-2-undecylimidazole, 1-cyanoethyl-2-ethyl-4-methylimidazole, 1-cyanoethyl-2-isopropylimidazole, 2,4-diamino-6-[2'-methylimidazolyl-(1')]ethyl-s-triazine, 2,4-diamino-6-[2'-ethyl-4'-methylimidazolyl-(1')]ethyl-s-triazine, 2,4-diamino-6-[2'-methylimidazolyl-(1')]-ethyl-s-triazine, 2-phenyl-4-methyl-5-hydroxymethylimidazole, 2-phenyl-4,5-dihydroxymethylimidazole, 1-cyanoethyl-2-phenyl-4,5-di(cyanoethoxymethyl)imidazole and 1-aminoethyl-2-methylimidazole.

It is also possible to replace the imidazoles of formula 1 with their acid adducts as accelerators for curing the novel compositions. Suitable adducts are those of carboxylic acids, for example phthalic acid, isophthalic acid, terephthalic acid, trimellitic acid or pyromellitic acid, and those of hydroxylic acids, for example isocyanuric acid.

Examples of suitable imidazole/acid adducts are 1-cyanoethyl-2-methylimidazoletrimellitate, 1-cyanoethyl-2-phenylimidazoletrimellitate, 1-cyanoethyl-2-ethyl-4-methylimidazoletrimellitate, 1-cyanoethyl-2-undecylimidazoletrimellitate; 2-methylimidazole/isocyanuric acid adduct, 2-phenylimidazole/isocyanuric acid adduct and 2,4-diamino-6[2'-methylimidazolyl-(1)']-ethyl-s-triazine/isocyanuric acid adduct.

A compound of formula II suitable as component (d) is, for example, 4,4'-methylenebis(2-ethyl-5-methylimidazole).

Examples of cyclic amidines of formula III are 1,5-diazabicyclo[4.3.0]non-5-ene, 1,5-diaza-bicyclo[4.4.0]dec-5-ene and 1,8-diazabicyclo[5.4.0]undec-7-ene.

Suitable amino-substituted pyridines of formula IV are, for example, 2-dimethylaminopyridine, 4-dimethylaminopyridine, 2-(methylethylamino)pyridine, 4-(methylethylamino)pyridine, 2-diethylaminopyridine, 4-diethylaminopyridine, 2-diphenylaminopyridine, 4-diphenylaminopyridine, 4-pyrrolidinylpyridine and 4-piperidinopyridine.

A preferred embodiment of this invention are compositions, wherein component (d) is a compound of formula I, wherein $R_1$ is hydrogen, methyl, ethyl, phenyl, benzyl, 2-cyanoethyl, 2-aminoethyl or a group of formula

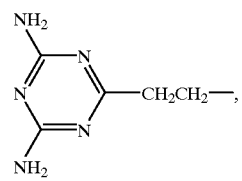

$R_2$ is hydrogen, methyl, ethyl, $NH_2$, isopropyl, undecyl, heptadecyl, phenyl or benzyl, and $R_3$ and $R_4$ are each independently of the other hydrogen, methyl, ethyl, hydroxymethyl or 2-cyanoethoxymethyl, a compound of formula II, wherein X is methylene, $R_1$ is hydrogen or methyl, and $R_2$ and $R_3$ are methyl or ethyl, a compound of formula III, wherein n is 1 or 2, or a compound of formula IV, wherein $R_5$ and $R_6$ are methyl or ethyl.

Particularly preferred components (d) are imidazole, 1-methylimidazole, 2-phenylimidazole, 2-ethyl-4-methylimidazole, 1,8-diazabicyclo-[5.4.0]undec-7-ene and 4-dimethylaminopyridine.

Fillers which may-suitably be used as component (e) in the novel compositions are, for example, metal powder, wood flour, glass powder, glass beads, semimetal oxides and metal oxides, for example $SiO_2$ (aerosils, quartz, quartz powder, silanised quartz powder, fused silica), corundum and titanium oxide, semimetal nitrides and metal nitrid6s, for example silicium nitride, boron nitride and aluminium nitride, semimetal carbides and metal carbides (SiC), metal carbonates (dolomite, chalk, $CaCO_3$), metal sulfates (baryte, gypsum), mineral powders and natural or synthetic minerals mainly from the silicate series, for example talcum, mica, kaolin, wollastonite, bentonite and others.

Component (e) is preferably a metal oxide, metal carbonate, metal sulfate or metal silicate or $SiO_2$.

Particularly preferred fillers (e) are quartz powder, silanised quartz powder and aluminium hydroxide.

The average diameter of the filler particles is preferably from 0.01 mm to 2.0 mm, particularly preferably from 0.1 mm to 1 mm.

The ratios of the components (a) to (e) present in the novel compositions can vary within a wide range.

The proportion of epoxy compound (a) in the entire amount of the epoxy resins (a)+(b) is preferably from 10% by weight to 90% by weight, more preferably from 20% by weight to 80% by weight, very particularly preferably from 30% by weight to 70% by weight. Accordingly, the proportion of epoxy resin (b) in the entire epoxy resin (a)+(b) is preferably from 90% by weight to 10% by weight, particularly preferably from 80% by weight to 20% by weight, very particularly preferably from 70% by weight to 30% by weight. In this case, component (a) can consist only of an epoxidised natural oil or of a mixture of several epoxidised oils. Component (b) can likewise be an epoxy resin or a mixture of several epoxy resins.

Component (c) is conveniently used in such an amount that there are 0.4 mol to 1.2 mol, preferably 0.5 mol to 1.15 mol, particularly preferably 0.7 mol to 1.1 mol, of an hydride groups present per mol of epoxy groups.

If appriopriate, the hardener component (c) may also contain minor amounts of polycarboxylic acids (up to 20% by weight, based on the amount of the anhydride) which can effect an increase in reactivity.

The proportion of the novel curing accelerator (d) is preferably from 0.05 to 10% by weight, based on the entire amount of the epoxy resins (a) +(b), particularly preferably from 0.1% by weight to 5% by weight and, very particularly preferably, from 0.5 to 2.0% by weight. It is also possible to use mixtures of different accelerators.

The filler content (e) is preferably from 30 to 85% by weight, particularly preferably from 40 to 80% by weight, based on the entire composition. The average diameter of the filler particles can be from about 1 μm to several mm, preferably from 100 μm to 1 mm.

In addition to components (a) to (e), the novel compositions can contain further customary additives, for example wetting agents, flow control agents, colourants, pigments, thixotropic agents, silicium-organic compounds, antioxidants, light stabilisers, flame retardants, plasticisers, thougheners, antifoams, demoulding agents and others.

The ready-to-use compositions are prepared by customary methods, for example by thoroughly mixing all components in a suitable apparatus. However, as the working life of the ready mixtures is limited, it is advantageous in epoxy resin technology to combine the individual components of the mixture in two or three components and to store them separately. Thus it is possible to store, for example, the anhydride hardener (c) and the accelerator (d) together as one component and the mixture of the epoxy resins (a) and (b) as the second component. The fillers (e) and other optional additives can be distributed to these two components in such a manner that the storability is not impaired.

Curing of the ready-to-use mixtures is also carried out by customary methods with the apparatus conventionally used in epoxy resin technology. The skilled person knows how to determine the optimum curing conditions, e.g. via DSC. Depending on the field of use, different requirements must be met regarding viscosity, curing temperature, gel time and the like, which can usually be achieved by adjusting the formulation components of the composition. Depending on the kind of composition, the cured products are either transparent or opaque (cloudy) materials which are almost colourless to dark brown in colour.

This invention also relates to the crosslinked products which are obtainable by curing a composition of this invention.

When using the novel hardener/accelerator system for mixtures comprising conventional epoxy resins and epoxidised natural oils, cured products are surprisingly obtained which afford only slightly less good or even better values with respect to glass transition temperature and fracture-mechanical properties than the corresponding conventional resins. Accordingly, this invention also relates to a process for the preparation of a crosslinked epoxy resin having a glass transition temperature of $T_g>80°$ C., measured via TMA, which comprises heating a composition comprising (a) a compound containing at least one epoxy group in inner position per molecule, obtained by epoxidation of a natural unsaturated oil or of its derivative;

(b) an epoxy compound selected from the group consisting of glycidyl ethers, glycidyl esters and cycloaliphatic epoxides;

(c) a polycarboxylic acid anhydride; and (d) a compound of formula I, II, III or IV or an acid adduct of a compound of formula I, II, III or IV

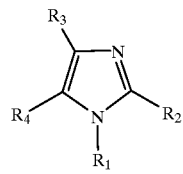

(I)

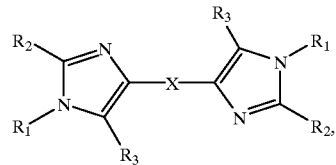

(II)

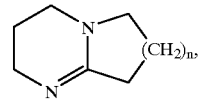

(III)

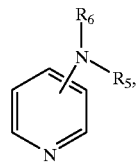

(IV)

wherein $R_1$ to $R_4$ are each independently of one another hydrogen; $C_1$–$C_{18}$alkyl which is unsubstituted or substituted by one or more than one hydroxyl group, amino group, halogen atom, cyano group, $C_1$–$C_6$alkoxy group or $C_1$–$C_6$cyanoalkoxy group; $C_5$–$C_{14}$aryl, $C_6$–$C_{24}$aralkyl, $C_3$–$C_{14}$heteroaryl or $C_4$–$C_{14}$heteroaralkyl which are unsubstituted or substituted by one or more than one $C_1$–$C_6$alkyl group, $C_1$–$C_6$alkoxy group or halogen atom, n is an integer from 1 to 3, and $R_5$ and $R_6$ are each independently of the other $C_1$–$C_6$alkyl or, together with the nitrogen atom, are a five- or six-membered ring, up to a degree of cure of at least 90% to a temperature of >70° C.

The crosslinked epoxy resins prepared by this process are another subject matter of this invention.

The novel compositions can be used in the customary fields of use for anhydride-cured epoxy resins.

In another of its aspects, this invention relates to the use of the composition according to claim 1 as casting resin for the preparation of moulded articles or, in particular, as impregnating, insulating or encapsulating material for electrical or electronic components.

EXAMPLES

The following substances are used in the following Examples:

ESO epoxidised soybean oil; epoxy value: 4.10–4.20 val/kg
ELO epoxidised linseed oil; epoxy value: 5.5–5.65 val/kg
epoxy resin 1 liquid diglycidyl ether of bisphenol A; epoxy value: 5.1–5.4 val/kg
epoxy resin 2 liquid diglycidyl ether of bisphenol A; epoxy value: 5.54 val/kg
epoxy resin 3 liquid hexahydrophthalic acid diglycidyl ester; epoxy value: 5.6–6.2 val/kg epoxy resin 4 3,4-epoxycyclohexanecarboxylic acid-3',4'-epoxycyclohexylmethyl ester;
epoxy value: 7.0–7.5 val/kg
hardener 1 methyltetrahydrophthalic anhydride
hardener 2 liquid anhydride hardener comprising 18.71% by weight of the reaction product of 2 mol of tetrahydrophthalic anhydride and 1 mol of neopentyl glycol, 48.77% by weight of methyltetrahydrophthalic anhydride and 32.52% by weight of hexahydrophthalic anhydride
hardener 3 liquid anhydride hardener based on hexahydrophthalic anhydride and methylhexahydrophthalic anhydride
hardener 4 methylhexahydrophthalic anhydride
hardener 5 Diels-Alder reaction product of 77.3% by weight of tung oil and 22.7% by weight of maleic anhydride
1-MI 1-methylimidazole
IM imidazole
BDMA benzyldimethylamine
PPG polypropylene glycol having a molecular weight of about 400 flexural test: ISO R178/93 fracture toughness (fracture energy $G_{1C}$ and critical stress intensity factor $K_{1C}$): double torsion test in accordance with CIBA-test PM 216/89 gel time: on heated plate electrical properties ($\epsilon_r$, tan δ): IEC 250 DIN 53483, measuring frequency 50 Hz Curing mode:

A: 2 h 110° C.+10 h 140° C.+2 h 160° C.
B: 10 h 140° C.+2 h 160° C.
C: 2 h 100° C.+10 h 140° C.+2 h 180° C.
D: 2 h 120° C.+10 h 140° C.+2 h 160° C.
E: 2 h 100° C.+10 h 140° C.+2 h 160° C.

TABLE 1

|  | Example | | | | | |
| --- | --- | --- | --- | --- | --- | --- |
|  | 1 | 2 | 3 | 4 | 5 (comparison) | 6 (comparison) |
| epoxy resin 1 [g] | 50 |  | 50 | 50 | 100 | 50 |
| epoxy resin 2 [g] |  | 50 |  |  |  |  |
| ESO [g] | 50 | 50 |  |  |  | 50 |
| ELO [g] |  |  | 50 | 50 |  |  |
| hardener 1 [g] | 80 |  | 93 | 94 | 90 | 80 |
| hardener 2 [g] |  | 79.53 |  |  |  |  |
| 1-MI [g] | 1 |  | 1 | 1 | 1 |  |
| IM [g] |  | 1 |  |  |  |  |
| BDMA [g] |  |  |  |  |  | 1.5 |
| PPG [g] |  | 4 |  | 5 |  |  |
| Byk A 501 [g] | 0.2 | 0.12 | 0.1 | 0.1 | 0.2 | 0.2 |
| quartz powder W 12 [g] | 295.6 | 358.5 | 360.0 | 371.7 | 312 | 296.5 |
| gel time at 140° C. [min] | 3.7 |  |  |  | 2.7 | 4.5 |
| Δ H [J/mmol] | 105 |  |  |  | 106 | 75 |
| curing mode | A | B | A | A | A | A |
| $T_g$ [° C.] | 116 | 76 | 130 | 121 | 134 | 81 |
| modulus of elasticity [MPa] | 8175 | 9395 | 10025 | 9613 | 10033 |  |
| flexural strength $\sigma_{max}$ [MPa] | 97 | 121 | 84 | 94 | 109 |  |
| elongation at $\sigma_{max}$ [%] | 1.42 | 1.70 | 0.88 | 1.06 | 1.16 |  |
| $G_{1C}$ [J/m$^2$] | 446 | 636 | 177 | 225 | 247 |  |
| $K_{1C}$ [MPa · (m)$^{1/2}$] | 2.00 | 2.56 | 1.40 | 1.54 | 1.65 |  |

Byk A 501 antifoam (of Byk Chemie)
W 12 quartz powder (Quarzwerke Frechen)
W 12 EST silanised quartz powder (Quarzwerke Frechen)
Instructions for the preparation and curing of the epoxy resin compositions:

The mixture components are weighed and are vigorously mixed under vacuum at room temperature until a homogeneous mixture is obtained which is free of air bubbles. The ready mixture is filled into suitable aluminium moulds pre-heated to 80° C. or 100° C. Before, those parts of the mould coming into contact with the mixture were treated with a demoulding agent. Curing is carried out in circulating air ovens according to the respective indicated curing mode.

The DSC measurements (differential scanning calorimetry) are carried out with a Mettler TA4000 apparatus. The enthalpy of reaction Δ H is determined by integrating the enthalpy measured as a function of the temperature in the DSC diagramme.

The glass transition temperatures $T_g$ listed in Tables 1 and 2 are measured on cured samples via DSC.

The mechanical properties are measured using the following test methods:

TABLE 2

|  | Example | | | | |
| --- | --- | --- | --- | --- | --- |
|  | 7 | 8 | 9 | 10 | 11 |
| epoxy resin 3 [g] | 50 | 50 | 50 | 50 |  |
| epoxy resin 4 [g] |  |  |  |  | 50 |
| ESO [g] | 50 | 50 |  | 25 | 50 |
| ELO [g] |  |  | 50 | 25 |  |
| hardener 3 [g] | 80 |  | 92 | 87 | 90 |
| hardener 4 [g] |  | 85 |  |  |  |
| 1-MI [g] | 1 | 1 | 1 | 1 | 1 |
| Byk A 501 [g] | 0.1 | 0.1 | 0.1 | 0.1 |  |
| quartz powder W 12 EST [g] | 336.3 | 345.6 | 358.6 | 349.3 | 354.7 |
| curing mode | B | B | B | B | C |
| $T_g$ [° C.] | 104 | 107 | 120 | 110 | ~150 |
| modulus of elasticity [MPa] | 8462 | 8850 | 9873 | 9838 | 8566 |
| flexural strength $\sigma_{max}$ [MPa] | 133 | 126 | 131 | 138 | 117 |
| elongation at $\sigma_{max}$ [%] | 2.36 | 1.77 | 1.56 | 1.75 | 1.80 |

TABLE 2-continued

| | | | | | |
|---|---|---|---|---|---|
| $G_{1C}$ [J/m²] | 853 | 444 | 343 | 442 | 513 |
| $K_{1C}$ [MPa·(m)^{1/2}] | 2.8 | 2.08 | 1.93 | 2.19 | 2.20 |
| tan δ (50 Hz) at 25° C. [%] | 1.1 | 0.6 | 0.6 | 0.7 | 1.1 |
| tan δ (50 Hz) at 100° C. [%] | 11.0 | 3.0 | 2.6 | 3.1 | 5.0 |
| tan δ (50 Hz) at 120° C. [%] | 27.3 | 8.0 | 4.6 | 7.1 | 7.8 |
| tan δ (50 Hz) at 140° C. | | 25.8 | 14.6 | 23.3 | 12.8 |
| $\epsilon_r$ (50 Hz) at 25° C. | 3.8 | 3.7 | 3.8 | 3.8 | 3.8 |
| $\epsilon_r$ (50 Hz) at 100° C. | 4.4 | 4.0 | 4.0 | 4.1 | 4.1 |
| $\epsilon_r$ (50 Hz) at 120° C. | 5.3 | 4.4 | 4.2 | 4.4 | 4.2 |

| | Example | | | |
|---|---|---|---|---|
| | 12 | 13 | 14 | 15 (comparison) |
| epoxy resin 3 [g] | | | 50 | 100 |
| epoxy resin 4 [g] | 50 | 50 | | |
| ESO [g] | 40 | 50 | 50 | |
| ELO [g] | 10 | | | |
| hardener 3 [g] | 92.3 | | 76.3 | 90 |
| hardener 4 [g] | | 95 | | |
| hardener 5 [g] | | | 10 | |
| 1-MI [g] | 1 | 1 | 1 | 0.5 |
| Byk A 501 [g] | 0.1 | 0.1 | 0.2 | 0.1 |
| quartz powder W 12 EST [g] | 359.2 | 364.2 | 348.2 | 354 |
| curing mode | D | B | B | E |
| $T_g$ [° C.] | ~165 | ~160 | 109 | 108 |
| modulus of elasticity [MPa] | 8937 | 8482 | 8121 | 11835 |
| flexural strength $\sigma_{max}$ [MPa] | 121 | 108 | 129 | 139 |
| elongation at $\sigma_{max}$ [%] | 1.64 | 1.49 | 2.39 | 1.30 |
| $G_{1C}$ [J/m²] | 441 | 270 | 868 | 437 |
| $K_{1C}$ [MPa·(m)^{1/2}] | 2.08 | 1.59 | 2.78 | 2.38 |
| tan δ (50 Hz) at 25° C. [%] | 0.7 | 0.5 | 0.6 | 0.6 |
| tan δ (50 Hz) at 100° C. [%] | 2.7 | 2.2 | 5.7 | 1.9 |
| tan δ (50 Hz) at 120° C. [%] | 4.1 | 2.8 | 16.8 | 4.0 |
| tan δ (50 Hz) at 140° C. [%] | 7.1 | 4.5 | | 19.0 |
| $\epsilon_r$ (50 Hz) at 25° C. | 3.6 | 3.6 | 3.7 | 3.9 |
| $\epsilon_r$ (50 Hz) at 100° C. | 3.9 | 3.8 | 4.2 | 4.1 |
| $\epsilon_r$ (50 Hz) at 120° C. | 4.0 | 3.8 | 4.8 | 4.2 |

What is claimed is:

1. A composition, which comprises
   (a) a compound containing at least one epoxy group in inner position per molecule, obtained by epoxidation of a natural unsaturated oil or of its derivative;
   (b) an epoxy compound selected from the group consisting of glycidyl ethers, glycidyl esters and cycloaliphatic epoxides;
   (c) a polycarboxylic acid anhydride;
   (d) a compound of formula I, II, III or IV or an acid adduct of a compound of formula I, II, III or IV

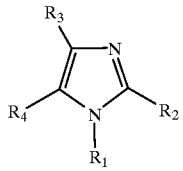

(I)

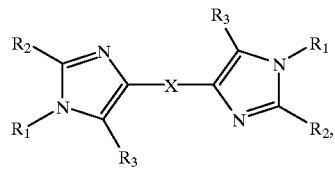

(II)

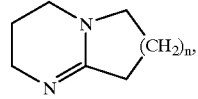

(III)

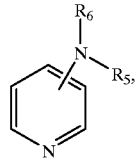

(IV)

wherein $R_1$ to $R_4$ are each independently of one another hydrogen; $C_1$–$C_{18}$alkyl which is unsubstituted or substituted by one or more than one hydroxyl group, amino group, halogen atom, cyano group, $C_1$–$C_6$alkoxy group or $C_1$–$C_6$cyanoalkoxy group; $C_5$–$C_{14}$aryl, $C_6$–$C_{24}$aralkyl, $C_3$–$C_{14}$heteroaryl or $C_4$–$C_{14}$heteroaralkyl which are unsubstituted or substituted by one or more than one $C_1$–$C_6$alkyl group, $C_1$–$C_6$alkoxy group or halogen atom, n is an integer from 1 to 3, and $R_5$ and $R_6$ are each independently of the other $C_1$–$C_6$alkyl or, together with the nitrogen atom, are a five- or six-membered ring, and (e) 20–90% by weight, based on the entire composition, of a filler, the average diameter of the filler particles being from 0.1 μm to 5.0 mm, wherein components (a) and (b) are present in an amount of from 10–90% by weight and from 90–10% by weight, respectively, based on the total weight of the combined amount of components (a) and (b).

2. A composition according to claim 1, wherein component (a) is epoxidised soybean oil or epoxidised linseed oil.

3. A composition according to claim 1, wherein component (a) is a mixture of two or more compounds having different epoxy values.

4. A composition according to claim 3, wherein component (a) is a mixture of epoxidised soybean oil and epoxidised linseed oil.

5. A composition according to claim 1, wherein component (b) is a diglycidyl ether of a bisphenol, an epoxy novolak, a diglycidyl ester of a dicarboxylic acid or a compound containing two terminal cycloalkene oxide groups.

6. A composition according to claim 1, wherein component (b) is a diglycidyl ether of formula V, a diglycidyl ester of formula VIa or VIb or a cycloaliphatic epoxy of formula VII

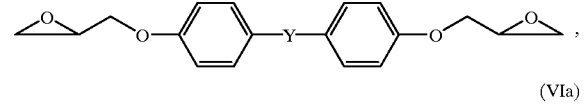

(V)

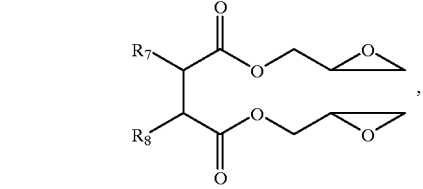

(VIa)

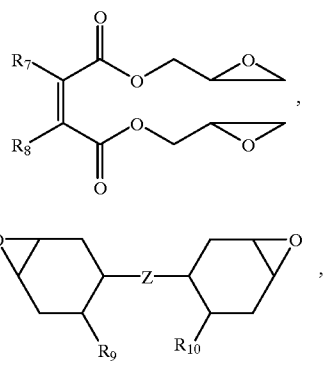

(VIb)

(VII)

wherein Y is a direct bond, methylene, ethylene, propylene, isopropylidene, —O—, —CO—, —S— or —SO$_2$—, R$_7$ and R$_8$ are each independently of the other hydrogen or C$_1$–C$_6$alkyl or, together with the carbon atoms to which they are bound, are a five- or six-membered ring, R$_9$ and R$_{10}$ are each independently of the other hydrogen or C$_1$–C$_6$alkyl, and Z is isopropylidene, —OCH$_2$CH$_2$O—, —COOCH$_2$— or —CH$_2$O—CO—(CH$_2$)$_4$—CO—OCH$_2$—.

7. A composition according to claim 1, wherein component (b) is a diglycidyl ether of bisphenol A, hexahydrophthalic acid diglycidyl ester or 3,4-epoxycyclohexanecarboxylic acid-3',4'-epoxycyclohexylmethyl ester.

8. A composition according to claim 1, wherein component (c) is a dicarboxylic acid anhydride of formula VIIIa or VIIIb

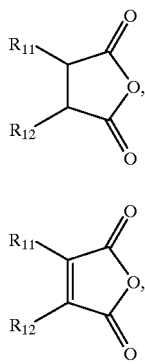

(VIIa)

(VIIb)

wherein R$_{11}$ and R$_{12}$ are each independently of the other hydrogen or C$_1$–C$_6$alkyl or, together with the carbon atoms to which they are bound, are a five- or six-membered ring.

9. A composition according to claim 1, wherein component (c) is methyltetrahydrophthalic anhydride, hexahydrophthalic anhydride, methylhexahydrophthalic anhydride or the Diels-Alder reaction product of 1 mol of tung oil and 0.5 to 3 mol of maleic anhydride.

10. A composition according to claim 1, wherein component (d) is a compound of formula I, wherein R$_1$ is hydrogen, methyl, ethyl, phenyl, benzyl, 2-cyanoethyl, 2-aminoethyl or a group of formula $$\text{NH}_2\text{-triazine-CH}_2\text{CH}_2\text{—},$$

R$_2$ is hydrogen, methyl, ethyl, isopropyl, undecyl, heptadecyl, phenyl or benzyl, and R$_3$ and R$_4$ are each independently of the other hydrogen, methyl, ethyl, hydroxymethyl or 2-cyanoethoxymethyl, a compound of formula II, wherein X is methylene, R$_1$ is hydrogen or methyl, and R$_2$ and R$_3$ are methyl or ethyl, a compound of formula III, wherein n is 1 or 2, or a compound of formula IV, wherein R$_5$ and R$_6$ are methyl or ethyl.

11. A composition according to claim 1, wherein component (d) is imidazole, 1-methylimidazole, 2-phenylimidazole, 2-ethyl-4-methylimidazole, 1,8-diazabicyclo-[5.4.0]undec-7-ene or 4-dimethylaminopyridine.

12. A composition according to claim 1, wherein component (e) is a metal oxide, metal carbonate, metal sulfate, metal silicate or SiO$_2$.

13. A composition according to claim 1, wherein component (e) is quartz powder, silanised quartz powder or aluminium hydroxide.

14. A crosslinked product obtainable by curing a composition according to claim 1.

15. A process for the preparation of a crosslinked epoxy resin having a glass transition temperature T$_g$>80° C., measured via TMA, which comprises heating a composition comprising (a) a compound containing at least one epoxy group in inner position per molecule, obtained by epoxidation of a natural unsaturated oil or of its derivative;

(b) an epoxy compound selected from the group consisting of glycidyl ethers, glycidyl esters and cycloaliphatic epoxides;

(c) a polycarboxylic acid anhydride; and (d) a compound of formula I, II, III or IV or an acid adduct of a compound of formula I, II, III or IV

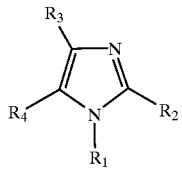

(I)

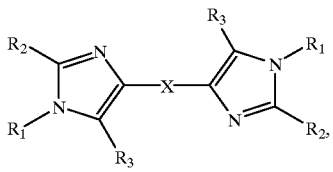

(II)

-continued (III)
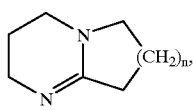

(IV)
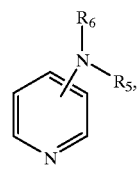

wherein $R_1$ to $R_4$ are each independently of one another hydrogen; $C_1$–$C_{18}$alkyl which is unsubstituted or substituted by one or more than one hydroxyl group, amino group, halogen atom, cyano group, $C_1$–$C_6$alkoxy group or $C_1$–$C_6$cyanoalkoxy group; $C_5$–$C_{14}$aryl, $C_6$–$C_{24}$aralkyl, $C_3$–$C_{14}$heteroaryl or $C_4$–$C_{14}$heteroaralkyl which are unsubstituted or substituted by one or more than one $C_1$–$C_6$alkyl group, $C_1$–$C_6$alkoxy group or halogen atom, n is an integer from 1 to 3, and $R_5$ and $R_6$ are each independently of the other $C_1$–$C_6$alkyl or, together with the nitrogen atom, are a five- or six-membered ring, up to a degree of cure of at least 90% to a temperature of >70° C.

16. The crosslinked epoxy resin prepared by the process according to claim 15.

* * * * *